United States Patent Office 3,046,201
Patented July 24, 1962

---

3,046,201
SYNTHETIC CULTURE MEDIA
Malcolm L. White and Donald C. Wehner, Stamford, Conn., assignors to American Cyanamid Company, New York, N.Y., a corporation of Maine
No Drawing. Filed July 17, 1961, Ser. No. 124,358
4 Claims. (Cl. 195—100)

This invention relates to microbiological media and is particularly concerned with improved nutrient media including crosslinked polyacrylamide as the hydrogel-forming constituent.

Media for the culturing of microorganisms are commonly prepared by dispersing from about 0.5% to 2.0% by weight of agar-agar in water. Nutrient ingredients such as malt extract, yeast extract, beef extract, peptone, and small amounts of inorganic salts are included to promote the growth of the organisms. The preparation is accomplished by mixing the agar-agar in hot water or a hot aqueous solution of nutrients to obtain a syrupy dispersion. Such agar-agar compositions gel when cooled to 40°–50° C. and may then be heated to 80°–90° C. without returning to the fluid state. Heating to above 90° C. causes liquefaction. Media of these characteristics have found wide use in bacteriological determinations and practices, and particularly in the preparation of culture plates, culture tubes, and slants.

Although microbiological techniques have been developed to utilize media of the physical properties characterizing agar-agar, the latter is not in all respects satisfactory. Dry agar-agar is generally produced in countries foreign to the United States, is expensive, and not always in dependable supply. Furthermore, aqueous dispersions of agar-agar may not be employed for many purposes because of their gelation and liquefaction temperatures, and their tendency to be liquefied by certain common organisms. An additional disadvantage is the fact that agar-agar does not readily form gels in water solutions containing relatively high concentrations of inorganic salts. For this reason it is not usually possible to use agar-agar hydrogels in working with organisms, such as piscicolous organisms, which flourish in sea water or other water of high salt content. In present practice, these problems are in part overcome by the use of gelatin, silica gel, and starch media and the development of specialized and complex laboratory techniques.

The present invention provides new and improved microbiological nutrient media including cross-linked polyacrylamide as the hydrogel-forming constituent. It has been found that aqueous dispersions of polyacrylamide copolymerized with one or more alkylidene-bis-acrylamides are characterized by desirable gelation properties which render these dispersions admirably suited for use as synthetic nutrient media.

The present invention contemplates polyacrylamide crosslinked with one or more alkylidene-bis-acrylamides wherein the final crosslinked polyacrylamide forms polymeric hydrogels in water in the absence of dispersing agents. The polymeric hydrogels of the present invention comprise between about 3 and about 20 parts by weight of water with 1 part of a water-soluble copolymerizable mixture of between about 0.01 and about 0.25 part of one or more selected alkylidene-bis-acrylamides per part of acrylamide.

Suitable alkylidene-bis-acrylamides are those having the formula:

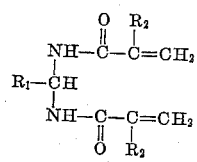

in which $R_1$ is hydrogen or lower alkyl and $R_2$ is hydrogen or methyl. Suitable lower alkyl groups are, for example, methyl, ethyl, n-propyl, isopropyl, n-butyl, etc. Any copolymerizable composition containing from about 1% to about 25% by weight of one or more alkylidene-bis-acrylamides according to the above formula and from about 75% to about 99% by weight of acrylamide may be employed in practicing the present invention to produce hydrogels by conversion of an aqueous solution of the copolymerizable composition to a gel. This conversion appears to be brought about by an additional or vinyl type polymerization with crosslinking by the bis-acrylamides resulting in a 3-dimensional structure.

Polymerization of the vinyl groups of the compounds used in accordance with our invention may be effected by heat alone but is effected preferably with any of the usual water-soluble oxygen-containing catalysts such as the ammonium, potassium and sodium persulfates, hydrogen peroxide, the alkali metal and ammonium chlorates, and the like. It is generally desirable to use a redox catalyst system of an oxygen-containing catalyst with a reducing agent such as sodium thiosulfate, sodium or potassium bisulfite or metabisulfite, etc.; a typical combination being the chloric acid-sulfurous or hydrosulfurous acid system. A mixture of the two materials in a redox system in quantities corresponding to their oxidation-reduction equivalents does not appear necessary but may be desirable for some purposes. The invention is not limited to any particular quantity of catalyst, but in general more than about 0.1% based on the weight of copolymerizable monomers is unnecessary. The time of gelation or copolymerization is related to the amount of heat or of catalyst employed, and the induction period may be reduced within limits by increasing the amount of heat and/or catalyst employed.

Certain redox systems require acid conditions, whereas others merely operate best under acid conditions. Hence, in such cases, polymerization below pH 7 is preferred. If acid polymerization is contemplated, any desired acidic material including sulfuric acid, hydrochloric acid, phosphoric acid, ammonium chloride, ammonium sulfate, etc., may be used for this purpose. In some cases, it may be desirable to use organic acids; but since they are more expensive this is generally not an economical procedure. However, acetic acid, oxalic acid, tartaric acid, phthalic acid and other acids may be used. While the quantities of acid employed may be varied widely from very small amounts which will produce a barely acid reaction, it is often preferable that the pH be relatively low and of the order of 3.5 to 4.0.

Polymerization of the vinyl groups of the compounds used in accordance with our invention may also be effected with organic catalysts upon irradiating with visible light. Suitable organic catalysts for this purpose are, for example, riboflavin, acriflavine, phloxine, rose bengale, eosin, fluorescein, rhodamine B and hematoporphyrin. The invention is not limited to any particular quantity of organic catalyst, but in general more than about 0.05% based on the weight of copolymerizable monomers is unnecessary. The time of gelation or copolymerization is related to the amount of visible light or of catalyst employed, and the induction period may be reduced within limits by increasing the amount of visible light and/or organic catalyst employed.

The ratio of polymerizable material (which will comprise from about 1% to about 25% by weight of alkylidene-bis-acrylamides, and preferably from about 3% to about 10% by weight based on total polymerizable material) to water may be varied widely, but generally should be within the range of about 3 to about 20 parts by weight of water to 1 part by weight of polymerizable material. The preferred range is between about 5 and about 15 parts of water per part of comonomers.

The dispersion or solution of the acrylamide and alkylidene-bis-acrylamides may be prepared in any convenient manner. Thus, the component materials may be mixed in the dry state, preferably in powder form, and the dry mixture may then be stirred carefully into either cold or hot water. Alternatively, the dry mixture may be stirred into a thick paste with a small portion of the water until all the particles are thoroughly wetted and this paste may then be stirred into the main portion of the water. Surface active agents, such as wetting agents and the like, may be combined with the dry powder to facilitate dispersion of the powder in the water provided such agent is not objectionable in the finished medium. The dispersion may also be prepared by stirring the acrylamide and the alkylidene-bis-acrylamides separately into water or they may be stirred into separate portions of the water and the two portions then combined. Inorganic salts in relatively high concentration may be included in the medium if desired. This is of particular advantage in case it is desired to culture microorganisms requiring a high concentration of salts for growth. Nutrients for the microorganisms may also be incorporated in the medium either before or after dispersion of the hydrogel-forming constituents and the medium may then be sterilized with steam in the usual manner prior to inoculation with the desired microorganisms. Alternatively, such of the inorganic salts and/or nutrients just referred to as may be prepared in solid form may be mixed with the dry, powdered mixture of the acrylamide and alkylidene-bis-acrylamides and dispersed in the water along with the mixture of comonomers. Other gelling agents, such as silica gel, starch, etc., may be incorporated in the dry mixture or in the final medium, if desired.

Gel-type media prepared in the manner just described are well suited to the culturing of a wide variety of microorganisms among which may be mentioned *Escherichia communior, Aerobacter aerogenes, Bacillus mesentericus, Cellulomonas biazotea, Saccharomyces cerevisiae, Torula utilis, Aspergillus niger, Chaetomium globosum, Fusarium saubenettii, Rhizoctonium solani* and *Lenzites trabea.*

The gels, when prepared as herein described, are practically clear and are sufficiently rigid so that Petri dishes containing the gel may be inverted during incubation without danger of the gel falling out. Once gelled, the gel-type media of the present invention are not subject to liquefaction upon the application of heat. Hence, incubation may be carried out at temperatures as high as from 50° to 70° C. without materially decreasing the rigidity of the gel. The development of colonies of microorganisms in the new media proceeds in a manner similar to the development in the conventional agar-agar medium.

While the invention has been described with particular reference to the use of mixtures comprising acrylamide and alkylidene-bis-acrylamides in the preparation of media for the propagation of microorganisms, it is to be understood that the novel compositions of the present invention are also of value in the preparation of pharmaceutical products such as mineral oil emulsions, etc., and for other purposes where the peculiar properties of agar-agar hydrogels are of value.

The invention will be described in greater detail in conjunction with the following specific examples.

*Example 1*

An aqueous culture medium was prepared using one part of methylene-bis-acrylamide and nine parts of acrylamide as the gelling constituents. The powdered mixture of acrylamide and methylene-bis-acrylamide was added slowly with vigorous stirring to 90 parts of a solution having the following composition:

| | Percent by weight |
|---|---|
| Dextrose | 8.0 |
| $KH_2PO_4$ | 0.4 |
| KCl | 0.1 |
| $MgSO_4.7H_2O$ | 0.1 |
| Water | q.s. ad. 100.0 |

An even dispersion was obtained to which was added 0.5 part of ammonium persulfate. Sufficient of the dispersion was then added to separate Petri dishes so as to form a layer about 0.25 inch thick in each dish. The Petri dishes and contents were then autoclaved with steam at 115° C. in the usual manner and then allowed to cool to about 45° C. Then, 0.1 ml. portions of water suspensions of *Penicillium notatum, Streptomyces griseus* and *Streptomyces aureofaciens* were placed on the gelled medium in separate Petri dishes, and the plates were incubated at 30° C. for 48 hours. At the end of this time it was observed that the separate colonies of organisms in each plate were very distinct and easily counted and that the consistency and general appearance of the plates were very similar to those formed and incubated under similar conditions but using from 1.5% to 2.0% of agar-agar as the gelling constituent.

*Example 2*

An aqueous beef extract-peptone culture medium was prepared using 0.5 part of methylene-bis-acrylamide, 0.5 part of ethylidene-bis-acrylamide, and nine parts of acrylamide as the gelling constituents and 0.25 part of potassium persulfate plus 0.25 part of sodium bisulfite as the catalyst. The powdered mixture of alkylidene-bis-acrylamides, acrylamide, and catalyst was added slowly to 90 parts of a solution of beef extract-peptone in water with vigorous stirring. An even dispersion was obtained and sufficient of the dispersion was added so as to form a layer about 0.25 inch thick in several Petri dishes. After standing for a short time at room temperature to permit the medium to gel, the plates were autoclaved with steam in the usual manner at 115° C. and then allowed to cool to about 45° C. Then, 0.1 ml. portions of water suspensions of *Cellulomonas biazotea, Aspergillus niger,* and *Bacillus mesentericus* were streaked in separate plates, and the plates were incubated at 30° C., for 48 hours. At the end of this time it was observed that the separate colonies of organisms in each plate were very distinct and easily counted.

*Example 3*

An aqueous beef extract-peptone culture medium was prepared using 0.5 part of methylene-bis-acrylamide, 0.5 part of ethylidene-bis-acrylamide, and nine parts of acrylamide as the gelling constituents and 0.005 part of riboflavin as the catalyst. The powdered mixture of alkylidene-bis-acrylamides, acrylamide, and riboflavin was added slowly to 90 parts of a solution of beef extract-peptone in water with vigorous stirring. An even dispersion was obtained and sufficient of the dispersion was added so as to form a layer of about 0.25 inch thick in several Petri dishes. The plates were then irradiated with visible light at room temperature until the medium gelled, and then the plates were autoclaved with steam at 115° C. in the usual manner and then allowed to cool to about 45° C. Then, 0.1 ml. portions of water suspensions of *Cellulomonas biazotea, Aspergillus niger* and *Bacillus mesentericus* were streaked in separate plates, and the plates were incubated at 30° C. for 48 hours. At the end of this time it was observed that the separate colonies of organisms in each plate were very distinct and easily counted.

We claim:

1. A nutrient microbiological medium comprising from about 3 to about 20 parts by weight of water and as a gelling constituent a polymer of (1) from about 0.01 to about 0.25 part by weight of at least one alkylidene-bis-acrylamide of the formula:

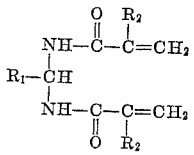

wherein $R_1$ is selected from the group consisting of hydrogen and lower alkyl and $R_2$ is selected from the group consisting of hydrogen and methyl, and (2) one part by weight of acrylamide.

2. A nutrient microbiological medium comprising from about 5 to about 15 parts by weight of water and as a gelling constituent a polymer of (1) from about 0.03 to about 0.10 part by weight of at least one alkylidene-bis-acrylamide of the formula:

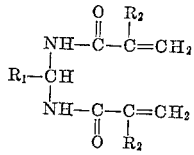

wherein $R_1$ is selected from the group consisting of hydrogen and lower alkyl and $R_2$ is selected from the group consisting of hydrogen and methyl, and (2) one part by weight of acrylamide.

3. A nutrient microbiological medium comprising from about 3 to about 20 parts by weight of water and as a gelling constituent a polymer of (1) from about 0.01 to about 0.25 part by weight of methylene-bis-acrylamide, and (2) one part by weight of acrylamide.

4. A nutrient microbiological medium comprising from about 5 to about 15 parts by weight of water and as a gelling constituent a polymer of (1) from about 0.03 to about 0.10 part by weight of methylene-bis-acrylamide, (2) from about 0.03 to about 0.10 part by weight of ethylidene-bis-acrylamide, and (3) one part by weight of acrylamide.

No references cited.